(12) United States Patent
Tabet et al.

(10) Patent No.: US 10,292,196 B2
(45) Date of Patent: May 14, 2019

(54) RADIO LINK CONTROL DUPLICATION FOR CARRIER AGGREGATION

(71) Applicant: Apple Inc., Cupertino, CA (US)

(72) Inventors: Tarik Tabet, Los Gatos, CA (US); Vinay Majjigi, Sunnyvale, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 94 days.

(21) Appl. No.: 14/496,358

(22) Filed: Sep. 25, 2014

(65) Prior Publication Data

US 2015/0181638 A1     Jun. 25, 2015

Related U.S. Application Data

(60) Provisional application No. 61/920,262, filed on Dec. 23, 2013.

(51) Int. Cl.
*H04W 76/15* (2018.01)
*H04W 28/08* (2009.01)
*H04L 1/18* (2006.01)

(52) U.S. Cl.
CPC ........... *H04W 76/15* (2018.02); *H04L 1/1893* (2013.01); *H04W 28/085* (2013.01)

(58) Field of Classification Search
CPC . H04W 76/025; H04W 24/04; H04W 28/085; H04W 72/02; H04W 72/048; H04W 72/10; H04L 1/189; H04L 1/1893
See application file for complete search history.

(56) References Cited

U.S. PATENT DOCUMENTS 8,605,674 B2    12/2013   Park et al.
9,462,627 B2 *   10/2016   Majjigi ............... H04W 76/048
(Continued)

FOREIGN PATENT DOCUMENTS

WO     2014060543     4/2014

OTHER PUBLICATIONS

Florian Kaltenberg et al , "Spectrum Overlay through Aggregation of Heterogeneous Dispersed Bands", European Conference on Networks and Communication, Jun. 24, 2014, 5 pages, IEEE.
(Continued)

*Primary Examiner* — Christopher P Grey
(74) *Attorney, Agent, or Firm* — Meyertons Hood Kivlin Kowert & Goetzel, P.C.; Jeffrey C. Hood; Luke S. Langsjoen

(57) ABSTRACT

This disclosure relates to carrier aggregation using separate RLC entities for different component carriers. According to one embodiment, a base station and a wireless device may establish a primary component carrier and at least one secondary component carrier according to a first radio access technology. Separate radio link control entities may be established for the primary component carrier and the secondary component carrier. Data communicated between the base station and the wireless device may be routed by way of the primary component or the secondary component carrier based on differing characteristics of the component carriers, and the RLC entities may treat downlink data differently on the primary component carrier and the secondary component carrier based on the differing characteristics of the component carriers.

20 Claims, 5 Drawing Sheets

(56) References Cited

U.S. PATENT DOCUMENTS

| | | | | |
|---|---|---|---|---|
| 2012/0250631 A1* | 10/2012 | Hakola | .................... | H04L 5/001 370/329 |
| 2012/0275390 A1* | 11/2012 | Korhonen | ........... | H04W 74/006 370/329 |
| 2012/0281527 A1* | 11/2012 | Sebire | ................. | H04W 76/028 370/228 |
| 2013/0136069 A1* | 5/2013 | Baldemair | .............. | H04L 5/001 370/329 |
| 2013/0329694 A1* | 12/2013 | Vrzic | .................. | H04W 36/165 370/331 |
| 2014/0023055 A1* | 1/2014 | Jeong | ...................... | H04L 5/001 370/336 |
| 2014/0056243 A1* | 2/2014 | Pelletier | ................. | H04W 74/04 370/329 |
| 2014/0269632 A1 | 9/2014 | Blankenship et al. | | |
| 2015/0055621 A1* | 2/2015 | Koskinen | .............. | H04W 36/18 370/331 |
| 2015/0181593 A1* | 6/2015 | Kim | .................. | H04W 52/0216 370/329 |
| 2016/0029427 A1* | 1/2016 | Zhong | .................. | H04W 36/18 370/329 |
| 2016/0143039 A1* | 5/2016 | Baldemair | ........ | H04W 72/1252 370/329 |
| 2016/0164739 A1* | 6/2016 | Skalecki | ............. | H04L 41/0896 370/389 |
| 2016/0255665 A1* | 9/2016 | Futaki | ................. | H04W 76/021 |
| 2017/0006587 A1* | 1/2017 | Kim | | |

OTHER PUBLICATIONS

"Spectrum Overlay through Aggregation of Heterogeneous Dispersed Bands", Florian Kaltenberger, et al., pp. 1-5.

* cited by examiner

RADIO LINK CONTROL DUPLICATION FOR CARRIER AGGREGATION

PRIORITY CLAIM

The present application claims benefit of priority to U.S. Provisional Application No. 61/920,262 titled "Radio Link Control Duplication for Carrier Aggregation" and filed on Dec. 23, 2013, which is hereby incorporated by reference in its entirety as though fully and completely set forth herein.

FIELD

The present application relates to wireless devices, and more particularly to a system and method for performing wireless communication with carrier aggregation using separate radio link control layers for each carrier.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

In some wireless communication systems, such as certain cellular communication networks, wireless communication is performed on frequency bands which have been licensed (e.g., by a cellular network provider). Additionally, in some wireless communication systems, such as Wi-Fi and Bluetooth wireless communication systems, wireless communication is performed on unlicensed frequency bands, such as the 2.4 GHz ISM frequency band.

SUMMARY

Embodiments are presented herein of, inter alia, methods for performing wireless communication with carrier aggregation using separate radio link control layer entities for each carrier, and of devices configured to implement the methods.

According to the techniques disclosed herein, a base station and a wireless device may establish multiple component carriers on which to perform wireless communication according to a wireless communication technology. The component carriers may include a primary component carrier and one or more secondary component carriers. The component carriers may have differing characteristics; for example, each component carrier may experience different channel conditions (e.g., as each may be established on a different frequency channel). In some instances, different component carriers may be established on different frequency bands, which may influence their characteristics; for example, a component carrier established on a licensed frequency band may typically experience better channel conditions than a component carrier established on a unlicensed frequency band.

The different component carriers may be provided with separate radio link control (RLC) layers. In other words, each of the primary component carrier and the secondary component carrier(s) may be provided with its own RLC layer. Alternatively, if there are multiple secondary component carriers, they may (as a group) share an RLC layer (which may still be separate from the RLC layer of the primary component carrier).

Providing different component carriers with separate RLC layers may allow for differently treated RLC flows for the different component carriers, which may improve the match between the characteristics of those flows and the characteristics of the component carriers on which they are communicated.

For example, different RLC segmentation may be appropriate depending on the channel conditions of a component carrier. Accordingly, if one component carrier is experiencing good channel conditions, larger RLC segments (which may be transported efficiently in larger transport block sizes, taking advantage of higher modulation and coding schemes available in good channel conditions) may be appropriate for that component carrier, while if another component carrier is experiencing poor channel conditions, smaller RLC segments (which may be transported in smaller transport block sizes, which may be the only transport block sizes available in poor channel conditions) may be appropriate for that component carrier. Providing separate RLC entities may allow for such differentiation, whereas in contrast if the different component carriers were to share an RLC entity, all those component carriers would be forced to use the same RLC segment size, potentially resulting in a sub-optimal situation if ideal RLC segmentation policies differ for the different component carriers such as in the above-provided example.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
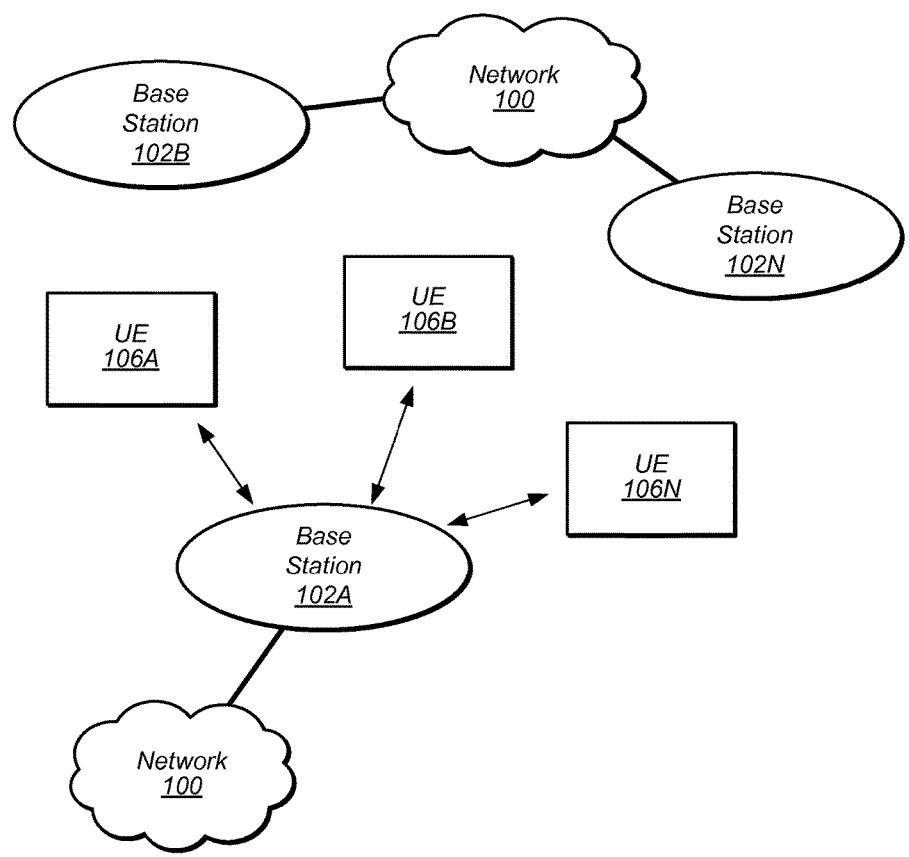
FIG. 1 illustrates an exemplary (and simplified) wireless communication system, according to one embodiment.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
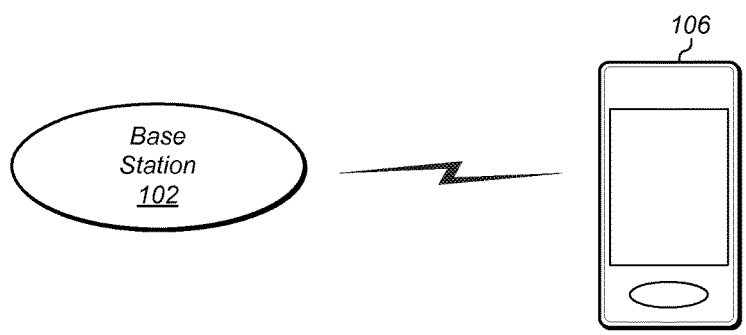
FIG. 2 illustrates a base station ("BS", or "eNodeB" or "eNB" in an LTE context) in communication with a user equipment ("UE") device, according to one embodiment.

FIGS. 1 and 2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to one embodiment. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

Figure 3:
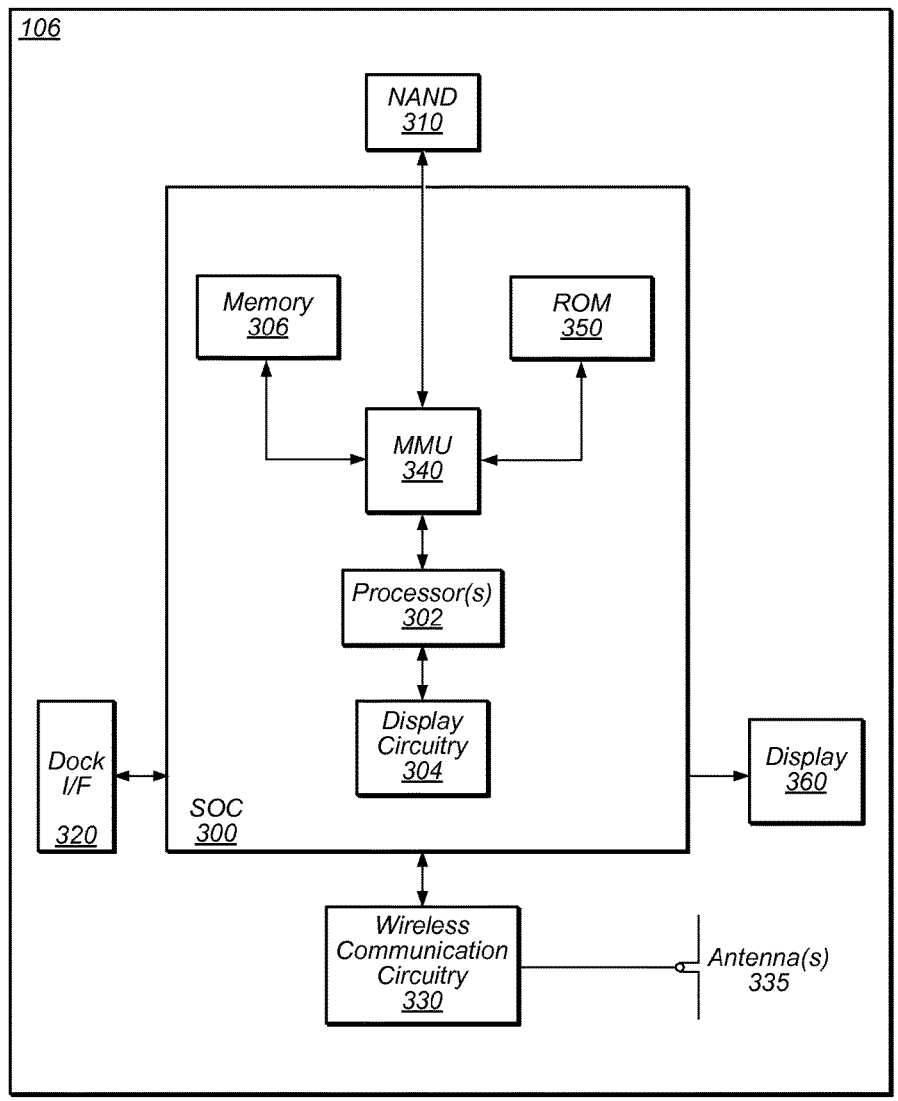
FIG. 3 illustrates an exemplary block diagram of a UE, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for carrier aggregation using separate radio link control layers for each carrier, such as those described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 4:
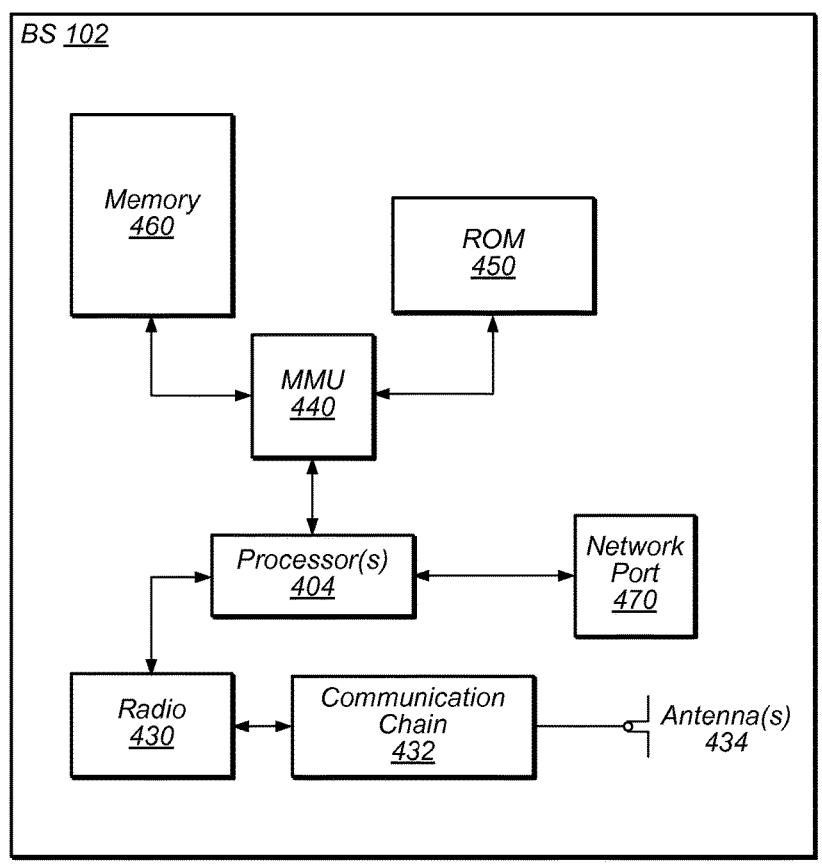
FIG. 4 illustrates an exemplary block diagram of a BS, according to one embodiment.

FIG. 4—Exemplary Block Diagram of a Base Station

FIG. 4 illustrates an exemplary block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio, which is capable of performing communications according to any of multiple wireless communication technologies (e.g., LTE and Wi-Fi).

As described further subsequently herein, the BS 102 may include hardware and software components for implementing features for carrier aggregation using separate radio link control layers for each carrier, such as those described herein with reference to, inter alia, FIG. 6. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein, such as the features described herein with reference to, inter alia, FIG. 6.

Figure 5:
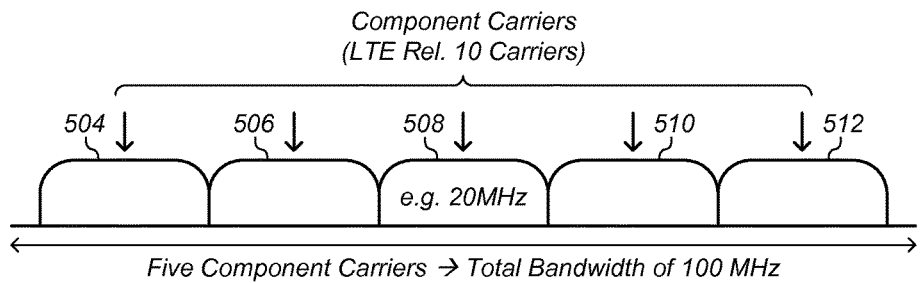
FIG. 5 illustrates an exemplary carrier aggregation scheme, according to one embodiment.

FIG. 5—Carrier Aggregation

Carrier aggregation is a scheme in which multiple carriers (e.g., frequency channels) may be used for wireless communication with a UE according to a wireless communication technology. FIG. 5 illustrates one exemplary carrier aggregation scheme (e.g., which may be used in accordance with the LTE radio access technology) which may be used in accordance with other aspects of this disclosure, such as with respect to the method of FIG. 6.

In the illustrated scheme, up to five component carriers (carriers 504, 506, 508, 510, 512) may be aggregated for a single user device (such as one of the UEs 106 illustrated in and described with respect to FIGS. 1-3). Each component carrier may use a channel width of up to 20 MHz. As one possibility, each component carrier may be an LTE release 10 single carrier. Thus, according to the exemplary scheme, a UE may be allocated up to 100 MHz of bandwidth. In many instances, such a carrier aggregation scheme may enable a UE participating in it with greater throughput than without such a scheme.

In many cases, component carriers may utilize adjacent frequency channels. However, it should be noted that it is also possible to implement carrier aggregation utilizing non-continuous frequency channels, potentially including non-continuous frequency channels within the same frequency band, and/or frequency channels within different frequency bands. For example, it may be possible to implement carrier aggregation using a frequency channel in a licensed frequency band as one component carrier, and a frequency channel in an unlicensed frequency band as another component carrier.

It should be noted that while the exemplary scheme illustrated in FIG. 5 and the associated description are provided by way of example as one possible manner of implementing carrier aggregation, they are not intended to be limiting to the disclosure as a whole. Numerous alternatives to and variations of the details thereof are possible and should be considered within the scope of the present disclosure. For example: carrier aggregation schemes may be implemented in conjunction with other wireless communication technologies; carriers according to other LTE releases or other radio access technologies altogether may be used; carriers having different channel widths may be used; different numbers of component carriers may be supported; and/or any of numerous other alternatives to and variations of the illustrated scheme are also possible.

Note that for systems which implement carrier aggregation, various control schemes/mechanisms are possible. As one possibility, an independent cell may be implemented on each component carrier, for example by providing a control channel with data scheduling and other control features for each cell on the component carrier for that cell. As another possibility, some or all control functions may be centralized. For example, a "primary cell" might be implemented on one ("primary") component carrier, while "secondary cells" might be implemented on any additional ("secondary") component carriers, such that some or all control information for the secondary cells is communicated by way of the primary cell.

Such a scheme may be referred to as "cross-carrier scheduling". In such a scheme, a network may provide control data (e.g., for scheduling user data communications, performing mobility related functions, etc.) for all cells by way of a control channel of the primary cell. For example, the control data may be communicated by way of a physical downlink control channel (PDCCH) of the primary cell.

The network may provide user data (e.g., application data for networking applications such as web browser applications, email applications voice call applications, video chat applications, game applications, etc.) to a UE in such a scheme on any or all of the primary or secondary cells. For example, various portions of the user data may be communicated by way of a physical downlink shared channel (PDSCH) of each of the primary cell and the secondary cells.

Thus, cross-carrier scheduling may be used in conjunction with carrier aggregation to centralize (at least a portion of) control communications on one cell. This technique may be used in many instances for infrastructure mode communications between a UE and a network. Such a technique may be particularly useful if different component carriers are known and/or expected to have different interference levels, since in such a case the carrier having the lowest interference level may advantageously be used for high priority control data. Such a situation may be the case, for example, if one component carrier is on a licensed frequency band for which the potential for interference is substantially limited to that caused by network controlled wireless communication, while another component carrier is on an unlicensed frequency band which may be subject to interference caused by wireless communication which is not under network control.

Figure 6:
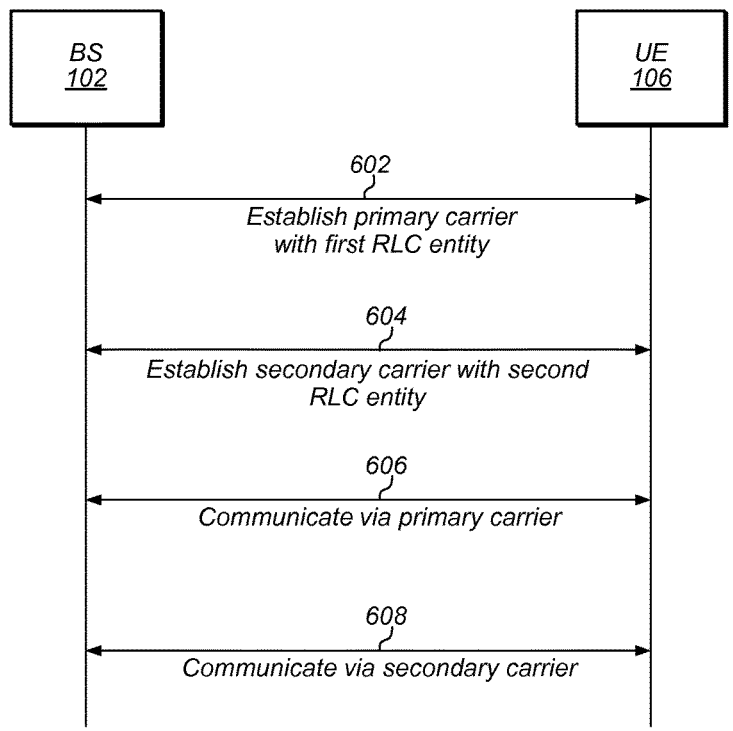
FIG. 6 is a communication flow diagram illustrating an exemplary method for performing wireless communication with carrier aggregation using separate radio link control layers for each component carrier, according to one embodiment.

FIG. 6—Communication Flow Diagram

FIG. 6 is a communication/signal flow diagram illustrating a scheme for performing wireless communication with carrier aggregation using separate radio link control (RLC) layers for each component carrier. The scheme shown in FIG. 6 may be used in conjunction with any of the computer systems or devices shown in the above Figures, among other devices. As shown, according to the scheme a BS 102 (e.g., such as illustrated in and described with respect to FIGS. 1-2 and 4) may provide a UE 106 (e.g., such as illustrated in and described with respect to FIGS. 1-3) with a carrier aggregation communication link having component carriers with independent RLC entities.

In various embodiments, some of the elements of the scheme shown may be performed concurrently, in a different order than shown, or may be omitted. Additional elements may also be performed as desired. As shown, the scheme may operate as follows.

In 602, the BS 102 may establish (e.g., configure) a primary carrier (which may also be referred to as a "primary cell", "primary component carrier", or "PCC") with the UE 106. The primary carrier may be established according to a first wireless communication technology (or "radio access technology" or "RAT"), such as LTE. The primary carrier may be established on a particular ("first") channel (e.g., a frequency channel).

As part of establishing the primary cell, the BS 102 and the UE 106 may establish and utilize an RLC layer/entity (a "first RLC entity"), e.g., in addition to various other protocol stack layers (e.g., radio resource control (RRC), media access control (MAC), physical (PHY)).

The first channel may be a channel in a licensed frequency band, which may also be referred to herein as a "first frequency band". For example, a cellular network provider may have licensed a particular frequency band (possibly specifically for use in conjunction with a particular radio access technology, such as LTE-A, LTE, WCDMA, CDMA2000, GSM, etc.), and may provide a cellular network which operates primarily within that licensed frequency band. Such a licensed frequency band may be subject to less external interference than an unlicensed frequency band. For example, an unlicensed frequency band might be subject to interference from other wireless communication technologies and/or from other cellular network operators utilizing a similar or the same wireless communication technology in the unlicensed frequency band, whereas a licensed frequency band may not be subject to such external interference sources, e.g., if the licensed frequency band is licensed for the exclusive use of one particular cellular network provider.

The primary carrier may provide the UE 106 with an infrastructure mode type communication link to a cellular network. Thus, the primary carrier may provide a connection to a core network, e.g., of a cellular service provider, with which a user of the UE 106 may have a subscription and/or other agreement to provide cellular service. The cellular network may thus provide connectivity between the user device and various services and/or devices coupled to the cellular network, such as other user devices, a public switched telephone network, the Internet, various cloud-based services, etc. The primary carrier may be used for control communications between the UE 106 and the BS 102, and may also be used for data (e.g., user data) communications.

Note that as part of such a cellular network, the base station 102 may operate in conjunction with numerous other base stations (which may provide other cells) and other network hardware and software to provide continuous (or nearly continuous) overlapping wireless service over a wide geographic area. At least in some instances, the UE 106 may select a cell with the BS 102 to establish as the primary cell from among multiple cells within wireless communication range of the UE 106, which may be provided by nearby base stations. For example, the UE 106 may be capable of discovering, detecting signals from, and possibly communicating with some or all of multiple neighboring cells, e.g., depending on signal strength/quality, permission, technological interoperability, etc. The primary cell may be selected and configured/established on the basis of one or more signal strength and/or signal quality measurements of the primary cell and/or other nearby cells, among other possible criteria (e.g., wireless traffic congestion of the cell(s), operator of the cell(s), wireless technology according to which the cell(s) operate, etc.).

Note further that cell selection may be an initial cell selection, e.g., upon powering on the UE 106 (or possibly after powering on a radio of the UE 106, e.g., upon exiting a limited-operation or "airplane mode"), according to some embodiments. Alternatively, the cell selection may be part of a cell re-selection procedure. For example, the UE 106 might perform a cell re-selection procedure to select a new cell with better signal strength and/or quality as a primary cell based on experiencing degraded signal strength and/or quality on a previous primary cell, e.g., as a result of moving from a service area of the previous primary cell to a service area of the new primary cell.

In 604, the BS 102 may establish (e.g., configure) a secondary carrier (or "secondary cell") with the UE 106. The BS 102 may activate the secondary carrier by providing an indication the UE 106 to establish the secondary carrier, e.g., via a configuration message (such as a "Scell Add" configuration message in LTE) transmitted on the primary carrier. The secondary carrier may be established according to the first wireless communication technology. The secondary carrier may be established on a particular ("second") channel.

As part of establishing the secondary cell, the BS 102 and the UE 106 may establish and utilize another RLC layer/entity (a "second RLC entity"), which may be separate from the first RLC entity. In other words, the RLC layer may be duplicated for each of the primary and secondary carrier. Note that this may be in addition to duplicating some or all other protocol stack layers, such as MAC and PHY; however, it may be the case that not all other protocol stack layers may be duplicated. For example, at least in some instances, any layers above the RLC layer may not be duplicated.

It may be the case that the second channel may be a channel be in an unlicensed frequency band, which may also be referred to herein as a "second frequency band". For example, the second frequency band may be an industrial-scientific-medical (ISM) frequency band. Alternatively, the second channel may be a channel in a licensed frequency band (e.g., the first frequency band, or another licensed frequency band), if desired.

In 606, the BS 102 and the UE 106 may communicate via the primary carrier. The communication may include uplink data (i.e., from the UE 106 to the BS 102) and/or downlink data (i.e., from the BS 102 to the UE 106); each of which may include control data and/or user data (which may correspond to any of a variety of applications and/or application types).

In 608, the BS 102 and the UE 106 may communicate via the secondary carrier. The communication may similarly include uplink data (i.e., from the UE 106 to the BS 102) and/or downlink data (i.e., from the BS 102 to the UE 106); each of which may include control data and/or user data (which may also correspond to any of a variety of applications and/or application types). Alternatively, at least in some instances communication via the secondary carrier may not include control data; for example, if cross-carrier scheduling is used, control data for the secondary cell may be communicated by way of the primary cell rather than the secondary cell.

Since separate RLC entities may be provided for the primary cell and the secondary cell, fine-grained control of communications between the BS 102 and the UE 106 may be possible.

Such fine-grained control may be desirable, at least in some instances, if characteristics of the primary cell and the secondary cell differ significantly. Such a situation might occur, as one possibility, if the secondary carrier is established on an unlicensed frequency band while the primary carrier is established on a licensed frequency band. For example, the unlicensed frequency band may be subject to interference from other wireless communication (e.g., potentially from one or more other wireless communication technologies) which is not under network control, may be subject to transmit power limitations (e.g., due to the US FCC and/or other regulating bodies), and/or may have characteristics otherwise differing from licensed frequency bands. Note that other scenarios than deployment of component carriers on licensed and unlicensed frequency bands may also result in different characteristics of the primary cell and the secondary cell, and also that RLC layer duplication may be implemented in some scenarios even if characteristics of the primary cell and the secondary cell do not differ significantly, if desired.

If characteristics of the primary cell and the secondary cell do differ significantly, the finer grained control provided by the separate RLC entities for each component carrier may allow for decisions at the RLC layer which make sense for each respective component carriers in light of its unique characteristics.

As one example of such fine grained control, packets communicated over the primary carrier may be segmented into different RLC segment sizes by the first RLC entity than the RLC segment sizes into which packets communicated over the secondary carrier may be segmented by the second RLC entity. In such a case, for example, smaller RLC segment sizes may be used for a component carrier experiencing poorer RF conditions than another component carrier. This might be the case if the primary cell is on a licensed frequency band and is experiencing good channel conditions, while the secondary cell is on an unlicensed frequency band and is experiencing poor channel conditions, as one possibility.

As a further example of such fine-grained control, it may be possible to select whether to communicate RLC segments over the primary carrier or the secondary carrier based on any of a variety of considerations. Some possible such considerations may include a priority level of the RLC segments, an application type associated with the RLC segments, or how many RLC retransmissions of the RLC segments have previously been attempted. For example, higher priority RLC segments and/or RLC segments for application types whose network communications are latency sensitive (such as a voice/VoLTE or other time-critical application) might be communicated on a component carrier experiencing (or expected to experience) good channel conditions (as might be the case on the primary cell if it is on a licensed frequency band), while lower priority RLC segments and/or RLC segments for application types whose network communications are not latency sensitive (such as email, file transfer, or other "best effort" traffic) might be communicated on a component carrier having channel conditions which are not as good or expected to be generally less predictable or of lower quality (as might be the case on the secondary cell if it is on a unlicensed frequency band).

Thus, according to the scheme of FIG. 6, a wireless device may be able to communicate with a cellular network on a carrier aggregation communication link for which at least two of the component carriers are provided with separate RLC entities. Note additionally that while the method of FIG. 6 describes steps for two component carriers each having its own separate RLC entity, the method may be expanded and/or repeated as desired to provide a wireless device with a cellular communication link having any number of component carriers, of which any or all may be provided with their own RLC entity.

Figure 7:
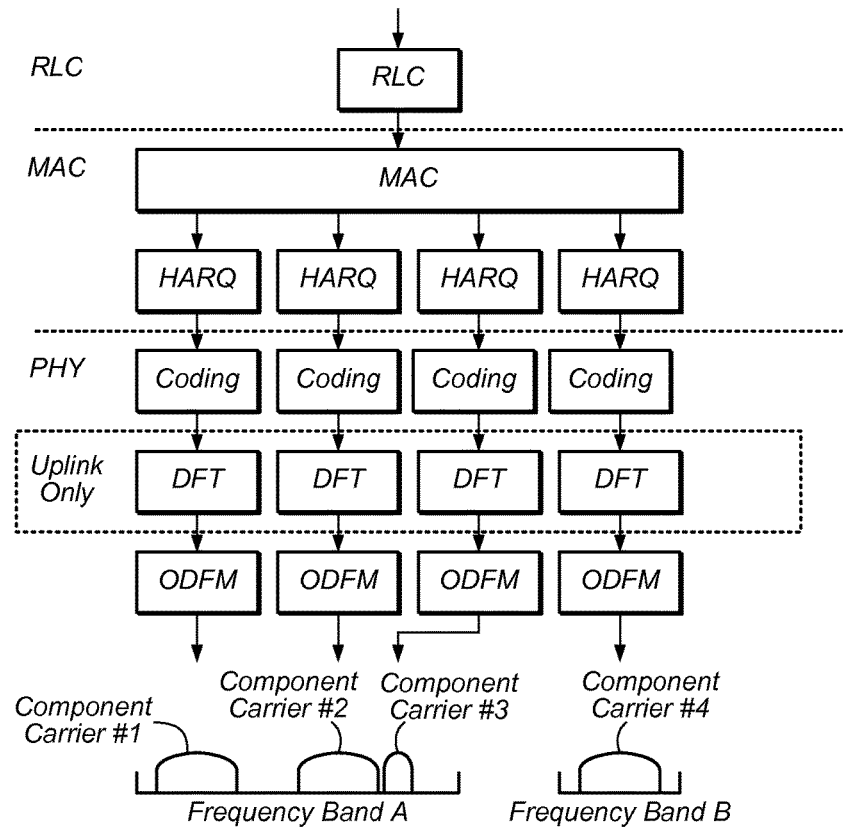
FIG. 7 illustrates an exemplary protocol stack diagram of a wireless communication system in which a single RLC layer is provided for multiple component carrier, according to one embodiments.
Figure 8:
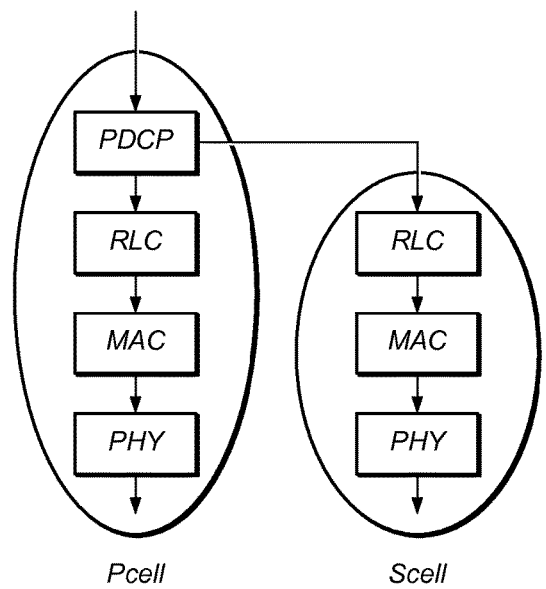
FIG. 8 illustrates an exemplary protocol stack diagram of a wireless communication system in which separate RLC layers are provided for each of multiple component carriers, according to one embodiment.

FIGS. 7-8—Protocol Stack Diagrams

FIGS. 7-8 illustrate protocol stack diagrams of wireless communication systems in which a single RLC layer is provided for multiple component carriers and in which separate RLC layers are provided for each of multiple component carriers respectively. Note that FIGS. 7-8 and the description thereof are provided by way of example of possible wireless communication systems, and are not intended to be limiting to the disclosure as a whole. Numerous alternatives to and variations of the details provided herein below are possible and should be considered within the scope of the present disclosure.

As shown, while MAC and PHY entities are duplicated across the component carriers, there is a single RRC connection in the exemplary scenario illustrated in FIG. 7. Since in this scenario the RLC is not duplicated across both (or all) component carriers, there could be data reliability issues. Specifically, if one carrier is much less reliable (e.g., an ISM band carrier) than the other (e.g., a licensed band carrier), than it may be more appropriate for the base station to treat the RLC flows differently.

As previously noted, performance on one carrier (e.g., a secondary cell or "Scell" on an unlicensed band) may differ from performance on another carrier (e.g., a primary cell or "Pcell" on a licensed band). For example, interference from other technologies such as Wi-Fi on unlicensed ISM bands may be difficult or impossible to control or predict. Furthermore, the transmit power of a carrier in an ISM band may be limited by restrictions/requirements by regulating bodies such as the Federal Communications Commission (FCC) in the United States.

Accordingly, in some carrier aggregation deployments the RLC layer may be duplicated at each cell/carrier, such as shown in FIG. 8. In other words, in addition to duplicating PHY and MAC layers at each cell/carrier, the RLC layer may also be duplicated. Note that higher layer entities (e.g., a packet data convergence protocol or PDCP) may still not be duplicated at each cell/carrier in the exemplary scenario illustrated in FIG. 8.

Each RLC entity may have an "acknowledge mode" that ensures reliability by retransmitting RLC packets as needed. Additionally, each RLC entity may have the ability to segment packets to smaller sizes/values (e.g., if channel conditions cannot support larger packets). Thus, using two (or more) RLC entities, a base station may be able to selectively make one transmission more robust (e.g., an ISM band component carrier) and another transmission less robust (e.g., a licensed band component carrier).

As a further possibility, RLC segments with high priority (as may be defined in any of a variety of ways and/or based on any of a variety of considerations) may be sent over a component carrier experiencing (or expected to experience) better channel conditions (e.g., a licensed band component carrier). Similarly, if the number of RLC retransmissions increases on a component carrier experiencing poorer channel conditions (e.g., an ISM band component carrier), the RLC packets may then be offloaded to a component carrier experiencing (or expected to experience) better channel conditions (e.g., a licensed band component carrier).

A similar idea may be applied (cascaded down) to MAC packets, if desired. For example, when a first transmission fails on a component carrier experiencing poorer channel conditions, HARQ retransmissions may be sent over a component carrier experiencing better channel conditions (e.g., to guarantee a certain delay budget).

Additionally, at the PHY layer, robust transmission (e.g., low modulation and coding scheme (MCS)) transport blocks may be sent over a component carrier experiencing poorer channel conditions, whereas high MCS/coding rate transport blocks may be sent over a component carrier experiencing better channel conditions, (e.g., since high MCS/coding rate transport blocks may require good channel conditions/high SINR requirements).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
a radio; and
a processing element operably coupled to the radio;
wherein the radio and the processing element are configured to:
    establish a primary component carrier for communication between the UE and a base station (BS) according to a first radio access technology (RAT), wherein a first radio link control (RLC) entity, a first media access control (MAC) entity, and a first physical layer (PHY) entity are established at the UE for the primary component carrier;
    communicate first data with the BS via the primary component carrier;
    receive, via the primary component carrier, a configuration message to establish a secondary component carrier for communication between the UE and the BS according to the first RAT, wherein a second RLC entity, a second MAC entity, and a second PHY entity are established at the UE for the secondary component carrier;
    communicate second data with the BS via the secondary component carrier;
    determine a first quality of channel conditions experienced by the primary component carrier, and configure the first RLC entity to segment the first data into RLC segments having a first segment size based on the determined first quality of channel conditions, wherein the first RLC entity is configured to transmit the first data segmented with the first segment size to the first MAC entity;
    determine a second quality of channel conditions experienced by the secondary component carrier, and configure the second RLC entity to segment the second data into RLC segments having a second segment size based on the determined second quality of channel conditions, wherein the second RLC entity is configured to transmit the data segmented with the second segment size to the second MAC entity;
    transmit the first data, segmented using RLC segments of the first segment size, to the BS via the primary carrier; and
    transmit the second data, segmented using RLC segments of the second segment size, to the BS via the secondary carrier, wherein the first and second segment sizes are different, and wherein said transmitting the second data is performed during a same period of time as transmission of the first data.

2. The UE of claim 1,
wherein the primary component carrier is established on a frequency channel in a licensed frequency band, wherein the secondary component carrier is established on a frequency channel in an unlicensed frequency band.

3. The UE of claim 1, wherein the radio and the processing element are further configured to:
determine that a predetermined number of unsuccessful RLC retransmissions of the second data have been attempted via the secondary component carrier; and
offload the second data from the secondary component carrier to the primary component carrier based on determining that the predetermined number of unsuccessful RLC retransmissions of the second data have been attempted via the secondary component carrier.

4. The UE of claim 1, wherein the radio and the processing element are further configured to select on which of the primary component carrier or the secondary component carrier to communicate each of the first data and the second data based a priority level of each of the first data and the second data, wherein the priority level of each of the first data and the second data is based at least in part on an application type associated with each of the first data and the second data.

5. The UE of claim 1, wherein the radio and the processing element are further configured to:
establish an additional secondary component carrier for communication between the UE and the BS according to the first RAT, wherein the second RLC entity, the second MAC entity, and the second PHY entity are also used for the additional secondary component carrier; and
communicate third data with the BS via the additional secondary component carrier.

6. The UE of claim 1, wherein the radio and the processing element are further configured to:
establish an additional secondary component carrier for communication between the UE and the BS according to the first RAT, wherein a third RLC entity, a third MAC entity, and a third PHY entity are established for the additional secondary component carrier; and
communicate third data with the BS via the additional secondary component carrier.

7. A method comprising:
by a base station:
configuring a primary carrier for communication with a wireless user equipment (UE) device according to a first wireless communication technology, wherein a first radio link control (RLC) entity, a first media access control (MAC) entity, and a first physical layer (PHY) entity are established at the base station for the primary carrier;
transmitting, via the primary component carrier, a configuration message configuring a secondary carrier for communication with the UE according to the first wireless communication technology, wherein a second RLC entity, a second MAC entity, and a second PHY entity are established at the base station for the secondary carrier;
determining a first quality of channel conditions experienced by the primary carrier, and configuring the first RLC entity to segment first data into RLC segments having a first segment size based on the determined first quality of channel conditions, wherein the first RLC entity is configured to transmit the first data segmented with the first segment size to the first MAC entity;
determining a second quality of channel conditions experienced by the secondary carrier, and configuring the second RLC entity to segment second data into RLC segments having a second segment size based on the determined second quality of channel conditions, wherein the second RLC entity is configured to transmit the data segmented with the second segment size to the second MAC entity;

transmitting the first data, segmented using RLC segments of the first segment size, to the UE via the primary carrier; and transmitting the second data, segmented using RLC segments of the second segment size, to the UE via the secondary carrier, wherein the first and second segment sizes are different, and wherein said transmitting the second data is performed during a same period of time as transmission of the first data.

8. The method of claim 7,
wherein the primary carrier is established on a frequency channel in a licensed frequency band,
wherein the secondary carrier is established on a frequency channel in an unlicensed frequency band.

9. The method of claim 7, the method further comprising:
selecting on which of the primary carrier or the secondary carrier to transmit each of the first data and the second data based on one or more of:
a priority level of the RLC segments;
an application type associated with the RLC segments.

10. A base station (BS), comprising:
a radio; and
a processing element operably coupled to the radio;
wherein the radio and the processing element are configured to:
establish a primary component carrier and at least one secondary component carrier for communication with a wireless user equipment (UE) device according to a first radio access technology (RAT), wherein separate radio link control (RLC) entities, separate media access control (MAC) entities, and separate physical layer (PHY) entities are established at the base station for the primary component carrier and the at least one secondary component carrier, wherein the secondary component carrier is established via a configuration message transmitted from the base station to the UE via the primary component carrier;
select on which component carrier to transmit downlink data to the UE based at least in part on differing characteristics of the component carriers;
determine a first quality of channel conditions experienced by the primary component carrier, and configure the RLC entity established for the primary component carrier to segment data into RLC segments having a first segment size based on the determined first quality of channel conditions, wherein the RLC entity established for the primary component carrier is configured to transmit data segmented with the first segment size to the MAC entity established for the primary component carrier;
determine a second quality of channel conditions experienced by the at least one secondary component carrier, and configure the RLC entity established for the at least one secondary component carrier to segment data into RLC segments having a second segment size based on the determined second quality of channel conditions, wherein the RLC entity established for the secondary component carrier is configured to transmit data segmented with the second segment size to the MAC entity established for the secondary component carrier transmit the first data, segmented using RLC segments of the first segment size, to the UE via the primary carrier; and transmit the second data, segmented using RLC segments of the second segment size, to the UE via the secondary carrier, wherein the first and second segment sizes are different, and wherein said transmitting the second data is performed during a same period of time as transmission of the first data.

11. The BS of claim 10, wherein the radio and the processing element are further configured to select on which component carrier to transmit downlink data to the UE based at least in part on characteristics of the downlink data.

12. The BS of claim 10,
wherein the differing characteristics of the component carriers comprise differing channel conditions.

13. The BS of claim 10,
wherein downlink data on the primary component carrier and the at least one secondary component carrier are transmitted using different modulation and coding schemes.

14. The BS of claim 10, wherein the radio and the processing element are further configured to:
re-route downlink data between component carriers if a number of retransmissions on a component carrier selected for the downlink data exceeds a threshold number of retransmissions.

15. The BS of claim 10, wherein the radio and the processing element are further configured to:
establish multiple secondary component carriers for communication with the UE according to the first RAT,
wherein separate RLC entities, MAC entities, and PHY entities are established for each secondary component carrier.

16. The BS of claim 10, wherein the radio and the processing element are further configured to:
establish multiple secondary component carriers for communication with the UE according to the first RAT,
wherein one RLC entity, one MAC entity, and one PHY entity are established for all secondary component carriers for the UE.

17. The method of claim 7, the method further comprising:
establishing multiple secondary component carriers for communication with the UE according to the first RAT,
wherein separate RLC entities, MAC entities, and PHY entities are established for each secondary component carrier.

18. The method of claim 7, the method further comprising:
establishing multiple secondary component carriers for communication with the UE according to the first RAT,
wherein one RLC entity, one MAC entity, and one PHY entity are established for all secondary component carriers for the UE.

19. The method of claim 7, the method further comprising:
selecting on which of the primary carrier or the secondary carrier to transmit each of the first data and the second data based on how many RLC retransmissions of the RLC segments have previously been attempted.

20. The UE device of claim 1, wherein the configuration message is an Scell Add configuration message.

* * * * *